United States Patent
Shin et al.

(10) Patent No.: US 9,164,873 B2
(45) Date of Patent: Oct. 20, 2015

(54) MONITORING METHOD AND APPARATUS FOR ARINC 653-BASED OPERATING SYSTEM

(71) Applicant: Electronics and Telecommunications Research Institute, Daejeon (KR)

(72) Inventors: Chang-Min Shin, Daejeon (KR); Tae-Ho Kim, Gunpo-si (KR); Chae-Deok Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 171 days.

(21) Appl. No.: 13/943,399

(22) Filed: Jul. 16, 2013

(65) Prior Publication Data

US 2014/0122937 A1     May 1, 2014

(30) Foreign Application Priority Data

Oct. 30, 2012     (KR) .................. 10-2012-0121344

(51) Int. Cl.
 G06F 11/00     (2006.01)
 G06F 11/36     (2006.01)
 H04B 7/185     (2006.01)

(52) U.S. Cl.
 CPC ........ *G06F 11/3636* (2013.01); *H04B 7/18506* (2013.01)

(58) Field of Classification Search
 CPC ........................................... G06F 11/36
 USPC .................................... 714/35, 38.1
 See application file for complete search history.

(56) References Cited

U.S. PATENT DOCUMENTS

| 4,672,611 | A | * | 6/1987 | Fukuhara et al. ............. 714/46 |
| 4,943,919 | A | * | 7/1990 | Aslin et al. .................... 701/3 |
| 5,019,980 | A | * | 5/1991 | Starr et al. .................. 701/33.4 |
| 7,149,612 | B2 | * | 12/2006 | Stefani et al. .............. 701/31.9 |
| 2007/0226702 | A1 | * | 9/2007 | Segger ......................... 717/130 |

* cited by examiner

*Primary Examiner* — Dieu-Minh Le
(74) *Attorney, Agent, or Firm* — Kile Park Reed & Houtteman PLLC

(57) ABSTRACT

Disclosed herein is a monitoring method and apparatus for an ARINC 653-based operating system. In the monitoring method for an ARINC 653-based operating system according to the present invention, a client system transfers information about a breakpoint to a target system. The breakpoint information is set in the target system. A Micro Controller Unit (MCU) reads a Program Counter (PC). If the breakpoint information matches the PC, an interrupt is caused. A function contained in the breakpoint information matching the PC is executed.

11 Claims, 4 Drawing Sheets

MONITORING METHOD AND APPARATUS FOR ARINC 653-BASED OPERATING SYSTEM

CROSS REFERENCE TO RELATED APPLICATION

This application claims the benefit of Korean Patent Application No. 10-2012-0121344, filed on Oct. 30, 2012, which is hereby incorporated by reference in its entirety into this application.

BACKGROUND OF THE INVENTION

1. Technical Field

The present invention relates generally to a monitoring method and apparatus for an Aeronautical Radio, Incorporated (ARINC) 653-based operating system and, more particularly, to technology for debugging and monitoring avionics software (SW) which complies with an ARINC 653 standard among system software components used for aircraft systems.

2. Description of the Related Art

Software used for aircraft systems requires high reliability and productivity. Due to these requirements, research into an operating system suitable for a special situation in which high reliability and safety are regarded as the most important thing is being conducted.

In particular, the concept of Integrated Modular Avionics (IMA) has appeared and a large amount of research into IMA has been conducted. IMA has been applied to avionics software standards, such as ARINC 653.

ARINC is an acronym for Aeronautical Radio, Incorporated, which is a non-profit organization owned by the United States, and has five fields (aviation, airports, national defense, government, transportation) as principal business areas. ARINC has first applied computer networks to police cars and railroad cars, and has defined standard specifications for communication services and avionics standards between ground stations and aircraft.

IMA is an acronym for Integrated Modular Avionics, and is composed of a large number of applications having different safety levels in the case of aircraft. IMA was introduced as technology for the safety and efficiency of these applications, so that applications and hardware are prevented from being mutually influenced by each other when the applications and hardware are developed or executed, thus reducing development costs of hardware or applications.

ARINC 653 is an interface between a system core and an application implemented for IMA, and is a technical standard for defining the real-time operating system of digital avionics systems defined by ARINC and application programs executed on the operating system.

A large-scale system, such as aircraft, is composed of a large number of application programs and processes. In ARINC 653, the concept of partitions is used so as to perform spatial partitioning and temporal partitioning of each application program. Spatial partitioning means that each separate partition does not influence physical memory resources of other partitions. Temporal partitioning means that temporal resources allocated to each partition cannot be interfered with by other partitions. Such a concept of partitions may prevent an error in one application program from negatively influencing the entire system in an environment in which an important duty is performed, such as that of an avionics system, thus providing high reliability.

Aircraft systems have evolved from various conventional computing environments that are independently configured (federated systems) into IMA structures for integration into a single system. Accordingly, the ARINC 653 standard has been established as system software (SW) for IMA in international aviation industries, but there is a limitation in that a monitoring model for avionics system software complying with the ARINC 653 standard has not yet been developed.

U.S. Pat. No. 5,019,980 discloses a display monitor for avionics systems, but technology disclosed in this U.S. patent merely presents technology related to an interface and an interface card between a Personal Computer (PC) and the buses of an aircraft system from the standpoint of the data buses of the aircraft system, but has a limitation in that technology for monitoring and debugging ARINC 653 standard-based software (SW) is not provided.

SUMMARY OF THE INVENTION

Accordingly, the present invention has been made keeping in mind the above problems occurring in the prior art, and an object of the present invention is to present a monitoring method for supporting high reliability and safety of ARINC 653 standard-based software used in aircraft systems, thus enabling various computing environments that are independently configured (federated systems) to be integrated into a single system.

In accordance with an aspect of the present invention to accomplish the above object, there is provided a monitoring method for an Aeronautical Radio, Incorporated (ARINC) 653-based operating system, including transferring, by a client system, information about a breakpoint to a target system, setting the breakpoint information in the target system, reading, by a Micro Controller Unit (MCU), a Program Counter (PC), if the breakpoint information matches the PC, causing an interrupt, and executing a function contained in the breakpoint information matching the PC.

Preferably, the breakpoint information may include an address value of the breakpoint and Instruction Address Breakpoint Register (IABR) setting information.

Preferably, setting the breakpoint information may include transferring, by a monitoring agent unit, the breakpoint information to a monitoring management unit by invoking a system call, and setting, by the monitoring management unit, the address value of the breakpoint at a location of an IABR determined depending on the IABR setting information.

Preferably, executing the function contained in the breakpoint information matching the PC may be configured such that, as an interrupt occurs, an Interrupt Service Routine (ISR) unit checks an Instruction address Breakpoint Control Register (IBCR) to determine a location of an IABR in which an address value of the breakpoint is set, and such that a function included in the location of the determined IABR is executed.

Preferably, the monitoring method may further include, before transferring the breakpoint information, initializing breakpoint information in the target system.

Preferably, initializing may be configured to, if the breakpoint information is included in an initialization routine of a kernel of an operating system or if the breakpoint information is included in an entire initialization routine of the target system, perform initialization.

In accordance with another aspect of the present invention to accomplish the above object, there is provided a monitoring apparatus for an Aeronautical Radio, Incorporated (ARINC) 653-based operating system, including a monitoring agent unit for transferring information about a breakpoint received from a client system to a monitoring management unit, the monitoring management unit for setting the breakpoint information in a register, causing an interrupt if the breakpoint information matches a Program Counter (PC), and executing a function contained in the breakpoint information matching the PC, and an Interrupt Service Routine (ISR) unit for defining a processing routine to be executed when the breakpoint information matches the PC.

Preferably, the monitoring agent unit may transfer the breakpoint information to the monitoring management unit in a form of a system call.

Preferably, the breakpoint information may include an address value of the breakpoint and Instruction Address Breakpoint Register (IABR) setting information.

Preferably, the monitoring management unit may set the address value of the breakpoint at a location of an IABR determined depending on the IABR setting information.

Preferably, the monitoring management unit may be configured such that, as an interrupt occurs, the ISR unit checks an Instruction address Breakpoint Control Register (IBCR) to determine a location of an IABR in which an address value of the breakpoint is set, and such that a function included in the location of the determined IABR is executed.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
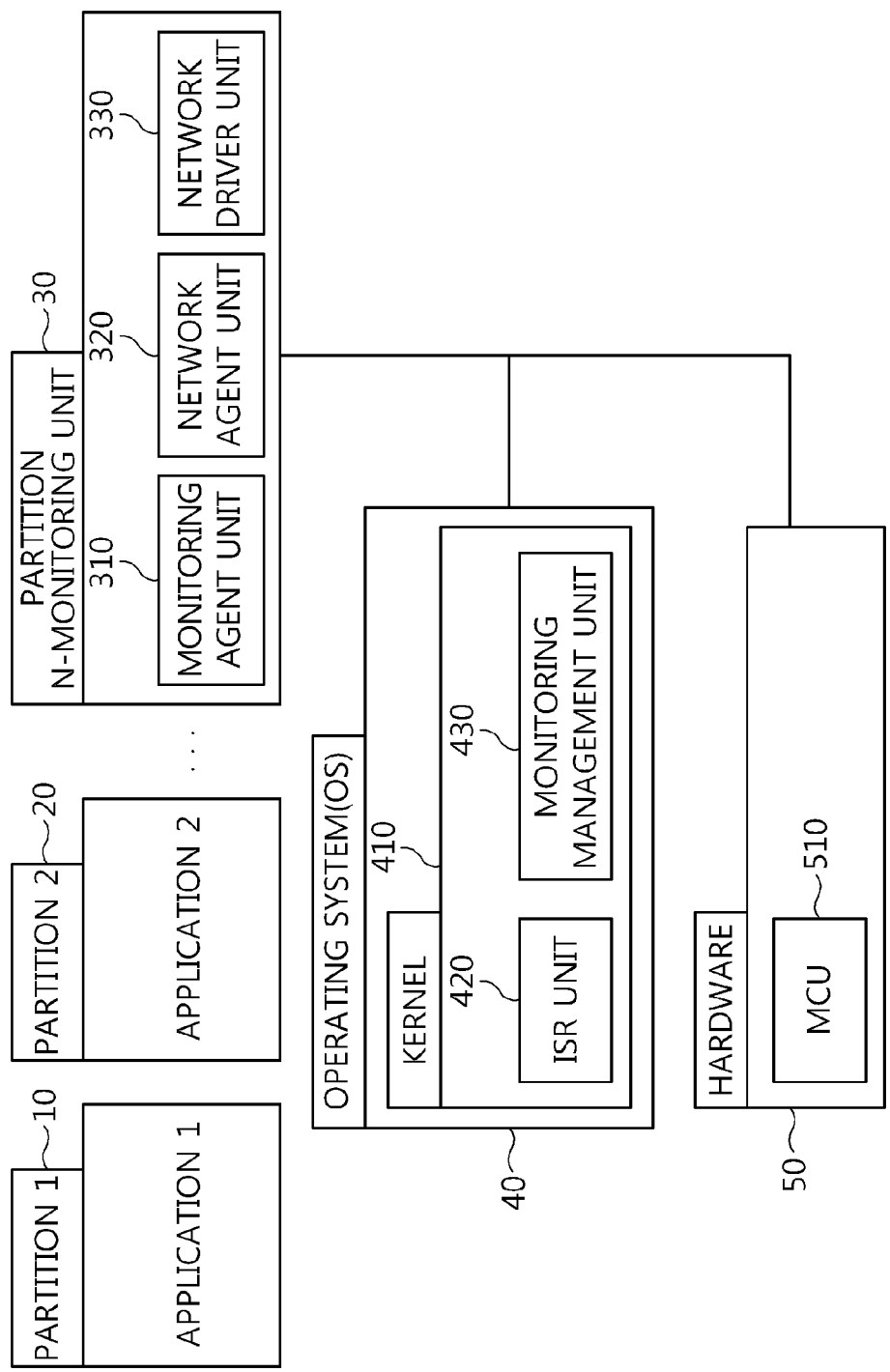
FIG. 1 is a diagram showing the configuration of a monitoring apparatus for an ARINC 653-based operating system according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, preferred embodiments of the present invention will be described in detail with reference to the attached drawings.

FIG. 1 is a diagram showing the configuration of a monitoring apparatus for an ARINC 653-based operating system according to an embodiment of the present invention.

Referring to FIG. 1, the monitoring apparatus for the ARINC 653-based operating system according to an embodiment of the present invention includes a monitoring unit 30, an operating system 40, and hardware 50.

The monitoring unit 30 includes a monitoring agent unit 310, a network agent unit 320, and a network driver unit 330.

In this case, an Interrupt Service Routine (ISR) unit 420 and a monitoring management unit 430 may be located in a kernel 410 of the operating system 40.

Here, the hardware 50 is configured to include a Micro Controller Unit (MCU) 510.

A system for implementing a monitoring function may be configured using a server/client structure.

The server is a target system configured to execute the monitoring function in conjunction with the ARINC 653-based operating system shown in FIG. 1, and to include the monitoring agent unit 310, the network agent unit 320, the network driver unit 330, the ISR unit 420, and the monitoring management unit 430. The client system is a system in which software for issuing a monitoring instruction and enabling the results of the monitoring instruction to be displayed is present.

The monitoring agent unit 310 processes communication information from an authorized external system, and communicates with the monitoring management unit 430 via a system call.

The monitoring management unit 430 processes the monitoring function.

The Interrupt Service Routine (ISR) unit 420 defines a processing routine to be executed when an event for each detailed function of the monitoring function occurs.

The network driver unit 330 is a driver for supporting the Ethernet or the serial connection of a system network.

The network agent unit 320 transmits/receives packet information through the network driver unit 330, analyzes the packet information, and then transfers monitoring instruction information to the monitoring management unit 430.

The ARINC 653 standard-based system is composed of a large number of applications and processes in a large-scale system such as aircraft, and the respective applications and processes are implemented in the form of partitions 10, 20, and 30.

In order to execute the functions of guaranteeing execution times of respective applications or the like and sharing memory, the concept of partitions has been used. The partitions are present in the form of processes in the user layers 10, 20, and 30, and the kernel layer 410 performs scheduling based on partitions using data having information about the partitions.

The monitoring function is included in a part of the real-time operation system based on the ARINC 653 standard, and is configured such that, when specific application software is running on the operating system, if a defined monitoring request instruction is received from external test system equipment, the operation of the target system is temporarily interrupted and, in this state, the function of reading information from the memory or writing a specific value at the location of the memory is executed in compliance with the request instruction, and such that, after the function has been executed, the target system resumes operation. An external request is transferred in the form of a packet through the Ethernet or the serial connection, and the contents of the packet are checked to identify the corresponding instruction and execute a debugging function.

The operating flow of the above monitoring apparatus for the ARINC 653-based operating system, which executes the monitoring function, will be described below.

First, an external client system transfers an instruction requesting a monitoring function in the form of a packet to the target system through the Ethernet or the serial connection.

The network driver unit 330 of the target system receives packet information containing monitoring instruction information from the external client system.

The network agent unit 320 analyzes the monitoring instruction information contained in the packet information, and transfers the monitoring instruction information contained in the packet information to the monitoring agent unit 310.

The monitoring agent unit 310 analyzes the monitoring instruction information to determine which one of detailed functions of the monitoring function has been requested by the external client system, and transfers the determined detailed function to the monitoring management unit 430 via a system call so that the function is executed by the monitoring management unit 430.

In this case, the detailed functions of the monitoring function may include a breakpoint function, a trigger function, an execution flow control function, memory read and write functions, register read and write functions, a snapshot function, and a cycle function.

The breakpoint function denotes the function of setting a breakpoint at an externally requested location so as to read the state of memory or write a value to the memory on a target board on which the ARINC 653 standard-based real-time operation system is executed, and releasing the breakpoint if it is unnecessary, and uses an Instruction Address Breakpoint Register (IABR), a Data Address Breakpoint Register (DABR), etc.

The trigger function denotes the function of conducting a predefined action depending on a predefined conditional expression after the breakpoint has been set and executed.

The execution flow control function denotes a function (breakpoint, run, continue, single step, etc.) capable of controlling the process execution flow of a specific application partition.

The memory read and write functions and the register read and write functions denote the functions of accessing the memory and the register of the target system and reading or writing values from or to the memory and the register, respectively.

The snapshot function denotes the function of dumping and reading values of specific variables among the memory contents of the target system, on which the ARINC 653 standard-based real-time operating system is performed, in the format of a snapshot.

The cycle function denotes a function based on a specific event, such as a timer event of an external test system, and is a function configured such that, as an event repeatedly occurs, a defined value is repeatedly written to a specific memory address. For example, the write function is executed in such a way that, whenever an event occurs for a single variable of application software, a value periodically increases by 1.

The monitoring management unit 430 executes detailed function instructions of the monitoring function received from the monitoring agent unit 310, and transfers resulting values thereof to the monitoring agent unit 310.

In this case, the monitoring management unit 430 accesses the memory and register of the target system in response to a system call from the monitoring agent unit 310, and sends a requested resulting value to the monitoring agent unit 310.

The monitoring agent unit 310 that received the resulting value forwards the resulting value to the network agent unit 320.

The network agent unit 320 configures packet information containing the resulting value, and transmits the packet information to the external client system through the network driver unit 330.

Figure 2:
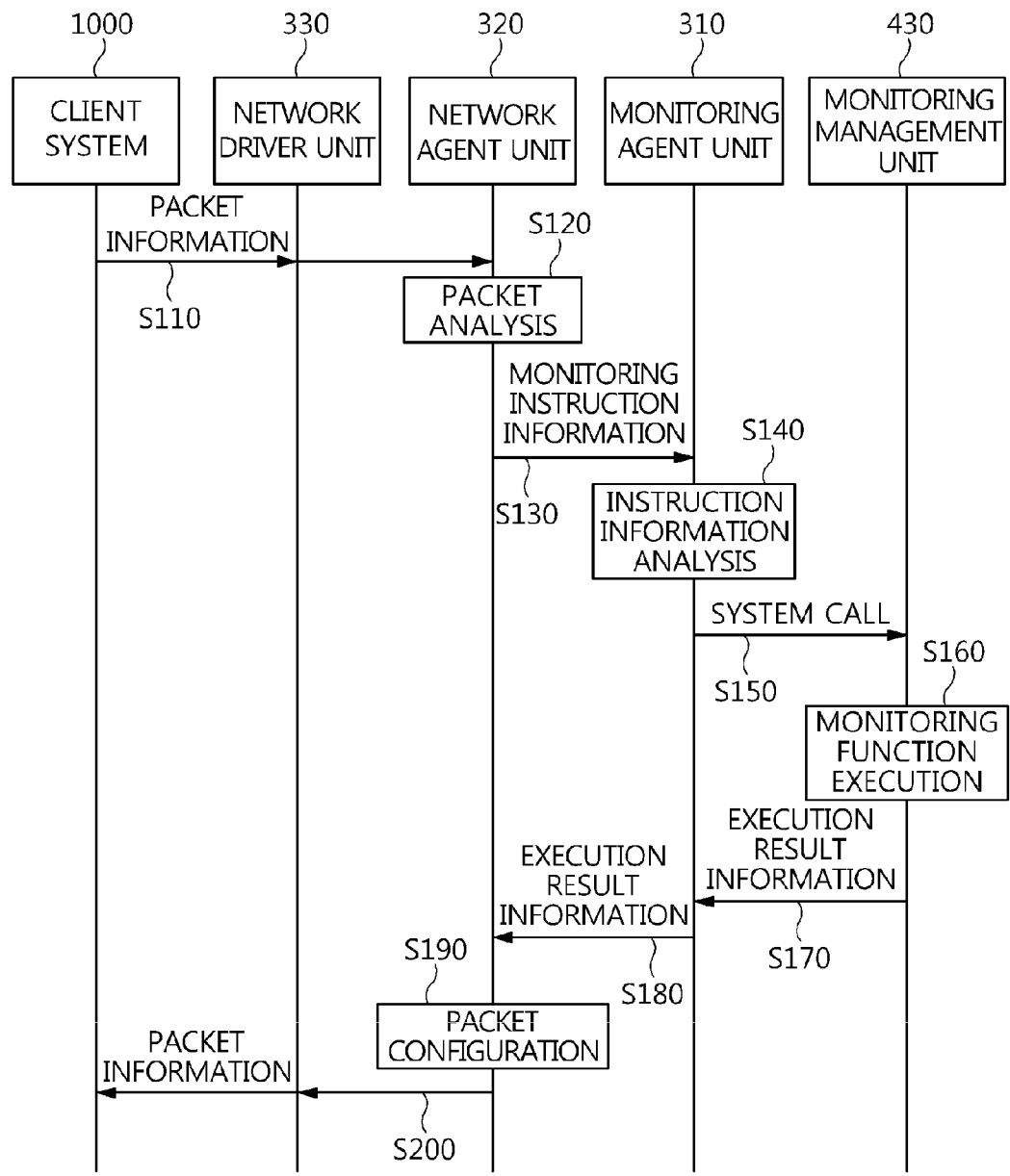
FIG. 2 is a diagram showing a monitoring method for an ARINC 653-based operating system according to an embodiment of the present invention.

FIG. 2 is a diagram showing a monitoring method for an ARINC 653-based operating system according to an embodiment of the present invention.

Referring to FIG. 2, in the monitoring method for the ARINC 653-based operating system according to an embodiment of the present invention, an external client system 1000 transfers an instruction requesting a monitoring function in the form of a packet to the network driver unit 330 through the Ethernet or the serial connection at step S110.

The network agent unit 320 receives the packet information containing the monitoring instruction information, transferred from the external client system 1000, through the network driver unit 330, and analyzes the monitoring instruction information contained in the packet information at step S120.

Thereafter, the network agent unit 320 transfers the monitoring instruction information contained in the packet information to the monitoring agent unit 310 at step S130.

The monitoring agent unit 310 analyzes the monitoring instruction information and then determines which one of detailed functions of the monitoring function has been requested by the external client system at step S140.

Thereafter, the monitoring agent unit 310 transfers information about the determined detailed function of the monitoring function to the monitoring management unit 430 via a system call at step S150.

The monitoring management unit 430 executes the detailed function instruction of the monitoring function received from the monitoring agent unit 310, and transfers the resulting value of the execution to the monitoring agent unit 310 at step S160.

In this case, the monitoring management unit 430 accesses the memory and register of the target system in response to the system call from the monitoring agent unit 310, and sends a requested resulting value to the monitoring agent unit 310 at step S170.

The monitoring agent unit 310 that received the resulting value forwards the resulting value to the network agent unit 320 at step S180.

The network agent unit 320 configures packet information containing the resulting value at step S190, and transmits the packet information to the external client system 100 through the network driver unit 330 at step S200.

Figure 3:
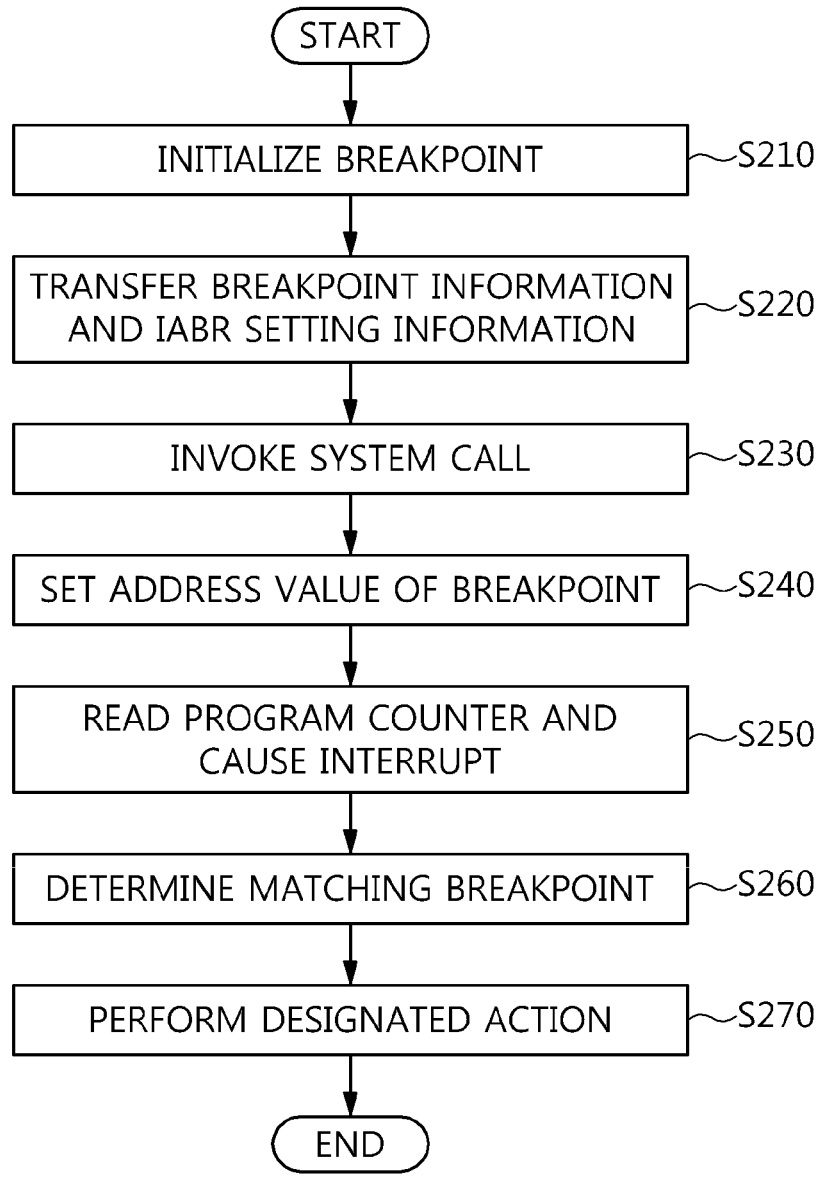
FIG. 3 is a flowchart showing a breakpoint processing procedure according to an embodiment of the present invention.

FIG. 3 is a flowchart showing a breakpoint processing procedure according to an embodiment of the present invention.

When the Micro Controller Unit (MCU) 510 of the target system is MPC8349E, an e300 core is loaded into the MCU, wherein the e300 core provides two Instruction Address Breakpoint Registers (IABRs) and two Data Address Breakpoint Registers (DABRs), and then supports the setting of a breakpoint based on hardware. Therefore, the monitoring function supports a breakpoint function and a trigger function using the IABRs and the DABRs.

Each IABR is configured to include IABR[CEA] indicating an address value to be compared and IABR[BE] indicating whether the breakpoint is currently enabled. IABR[CEA] has remaining bits other than the lower 2 bits of a virtual address, and IABR[BE] indicates whether the corresponding IABR is operating. Since IABR1 and IABR2 respectively correspond to Special Purpose Register (SPR)-1010 and SPR-1018, they can be accessed in compliance with a Move to SPR (mtspr) instruction and a Move from SPR (mfspr) instruction.

The breakpoint function is executed such that, if the client system designates a breakpoint, a monitoring server mounted on the target system to be monitored receives the breakpoint and designates the breakpoint, and such that, if a Program Counter (PC) reaches the address of the corresponding breakpoint, the overall execution is interrupted, and action to be performed at the address of the breakpoint is conducted.

In order to describe such a function in detail, a description will be made with reference to FIG. 3. That is, in the breakpoint processing procedure according to the embodiment of the present invention, information about a breakpoint is initialized at step S210.

In this case, the initialization step may be performed such that, if the initialization of the breakpoint information is included in the initialization routine of the kernel 410 of the operating system 40 or if it is included in the entire initialization routine of the target system, initialization is performed.

Thereafter, the client system 1000 sets the breakpoint information and transfers the breakpoint information to the target system at step S220.

Here, the breakpoint information may include the address value of the breakpoint and IABR setting information.

Thereafter, the monitoring agent unit 310 invokes a system call, and transfers the breakpoint information to the monitoring management unit 430 at step S230.

Then, the breakpoint information is set in the target system at step S240.

Here, the monitoring management unit 430 sets the address value of the breakpoint at the location of the IABR determined depending on the IABR setting information.

The monitoring management unit 430 sets the address value of the given breakpoint in IABR1[CEA] or IABR2 [CEA] depending on the breakpoint information.

In this case, since IABR1[CEA] and IABR2[CEA] do not have lower 2 bits, the address is set by masking the lower 2 bits with 0xfffffffc. IABR1[BE] or IABR2[BE] is set to 1 and then enabled.

Thereafter, the MCU reads the Program Counter (PC) so as to fetch another instruction at step S250.

In this case, when the location of the PC read by the MCU matches the location of the IABR1 or the IABR2, an interrupt corresponding to 0x1300 occurs at step S250.

Thereafter, as the interrupt corresponding to 0x1300 occurs, the ISR unit 420 checks Instruction address Breakpoint Control Register (IBCR)[IABRSTAT] and IBCR [IABR2STAT] through a 0x1300 interrupt handler, and then determines which one of the locations of breakpoints of IABR1 and IABR2 matches the location of the PC and the interrupt occurs at step S260.

The IBCR is configured to include IBCR[IABRSTAT] indicative of the state of IABR1, IBCR[IABR2STAT] indicative of the state of IABR2, IBCR[CMP] indicative of the comparison type of IABR1, IBCR[CMP2] indicative of the comparison type of IABR2, IBCR[SIG-TYPE] indicative of a condition for causing an interrupt depending on whether IABR1 or IABR2 has been satisfied, and IBCR[DNS] indicative of a condition related to whether an external signal is generated. IBCR[IABRSTAT] is '1' when the condition of the IABR1 is satisfied, and IBCR[IABR2STAT] is '1' when the condition of the IABR2 is satisfied. The CMP indicates conditions in which, if the address designated in the IABR1 is 1) identical to a currently fetched address, 2) greater than the currently fetched address, or 3) less than the currently fetched address, the IABR1 is satisfied. IBCR[CMP2] relates to the IABR2, and the conditions thereof are identical to those of IBCR[CMP]. IBCR[SIG-TYPE] indicates a type in which the conditions of the IABR1 and the IABR2 are to be combined with each other. IBCR[DNS] determines whether the caused interrupt is to be used to generate an external signal. Since the IBCR is operated only in a supervisor mode, and corresponds to SPR-309, it can be accessed in compliance with a Move to SPR (mtspr) instruction and a Move from SPR (mfspr) instruction.

Thereafter, a function designated in the IABR1 or IABR2 is executed depending on whether the condition of the IABR1 or IABR2 has been satisfied at step S270.

Meanwhile, compared to the breakpoint function, the trigger function has a processing procedure identical to that of the breakpoint function except that Data Address Breakpoint Register (DABR) and Data Breakpoint Control Register (DBCR)[DABRSTAT] instead of IABR and IBCR [IABRSTAT] are used.

Figure 4:
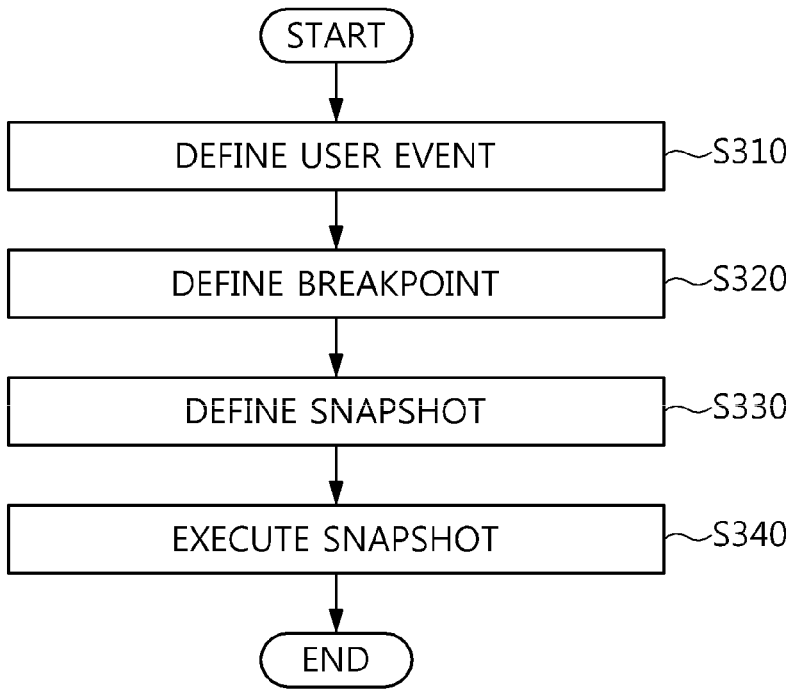
FIG. 4 is a flowchart showing a snapshot processing procedure according to an embodiment of the present invention.

FIG. 4 is a flowchart showing a snapshot processing procedure according to an embodiment of the present invention.

Referring to FIG. 4, in the snapshot processing procedure according to an embodiment of the present invention, the client system 1000 sequentially defines a user event, a breakpoint, and a snapshot in the target system at steps S310, S320, and S330.

Thereafter, the client system 1000 sends an initially defined user event to the target system to allow a snapshot to be executed at step S340.

In this case, after the snapshot has been executed, whenever a predefined breakpoint event occurs, values of variables requested by the client system 1000 are dumped and read and are then stored in the target system.

Thereafter, when the client system requests stored values, the target system provides the values to the client system.

Figure 5:
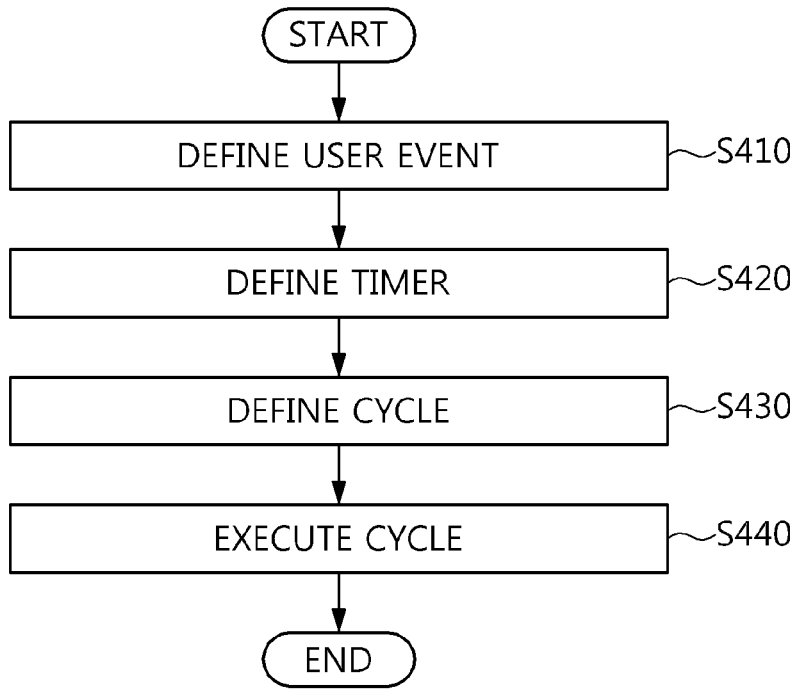
FIG. 5 is a flowchart showing a cycle processing procedure according to an embodiment of the present invention.

FIG. 5 is a flowchart showing a cycle processing procedure according to an embodiment of the present invention.

Referring to FIG. 5, in the cycle processing procedure according to the embodiment of the present invention, the client system 1000 sequentially defines a user event, a timer and a cycle in the target system at steps S410, S420, and S430.

Thereafter, the client system 1000 sends an initially defined user event to the target system to allow a cycle to be executed at step S440.

In this case, after the cycle has been executed, whenever a predefined timer event occurs, a predefined value is written to a memory address requested by the client system 1000.

In accordance with embodiments of the present invention, the present invention supports high reliability and safety of avionics application software based on the ARINC 653 standard, thus promoting the development and exchange of avionics application software technology, and activating the business of avionics application software areas.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A monitoring method for an Aeronautical Radio, Incorporated (ARINC) 653-based operating system, the method comprising:
   transferring, by a client system, breakpoint information about a breakpoint to a target system;
   setting the breakpoint information in the target system;
   reading, by a micro controller unit, a program counter;
   if an address value of the breakpoint contained in the breakpoint information matches a value of the program counter, causing an interrupt of operation of the target system; and executing a monitoring function contained in the breakpoint information matching the value of the program counter.

2. The monitoring method of claim 1, wherein the breakpoint information includes an Instruction Address Breakpoint Register (IABR) setting information.

3. The monitoring method of claim 2, wherein setting the breakpoint information comprises:
transferring, by a monitoring agent unit, the breakpoint information to a monitoring management unit by invoking a system call; and
setting, by the monitoring management unit, the address value of the breakpoint at a location of an IABR determined depending on the IABR setting information.

4. The monitoring method of claim 1, wherein executing the monitoring function contained in the breakpoint information matching the value of the program counter is configured such that, as an interrupt occurs, an interrupt service routine unit checks an Instruction address Breakpoint Control Register (IBCR) to determine a location of an IABR in which an address value of the breakpoint is set, and such that a monitoring function included in the location of the determined IABR is executed.

5. The monitoring method of claim 1, further comprising, before transferring the breakpoint information, initializing breakpoint information in the target system.

6. The monitoring method of claim 5, wherein initializing is configured to, if the breakpoint information is included in an initialization routine of a kernel of an operating system or if the breakpoint information is included in an entire initialization routine of the target system, perform initialization.

7. A monitoring apparatus for an Aeronautical Radio, Incorporated (ARINC) 653-based operating system, the monitoring apparatus comprising:
a monitoring agent unit for transferring information about a breakpoint received from a client system to a monitoring management unit;
the monitoring management unit for setting the breakpoint information in a register, causing an interrupt of operation of a target system if an address value of the breakpoint contained in the breakpoint information matches a value of a program counter, and executing a monitoring function contained in the breakpoint information matching the value of the program counter; and
an interrupt service routine unit for defining a processing routine to be executed when the breakpoint information matches the value of the program counter.

8. The monitoring apparatus of claim 7, wherein the monitoring agent unit transfers the breakpoint information to the monitoring management unit in a form of a system call.

9. The monitoring apparatus of claim 7, wherein the breakpoint information includes an IABR setting information.

10. The monitoring apparatus of claim 9, wherein the monitoring management unit sets the address value of the breakpoint at a location of an IABR determined depending on the IABR setting information.

11. The monitoring apparatus of claim 7, wherein the monitoring management unit is configured such that, as the interrupt occurs, the interrupt service routine unit checks an IBCR to determine a location of an IABR in which an address value of the breakpoint is set, and such that a monitoring function included in the location of the determined IABR is executed.

* * * * *